Jan. 15, 1924.
H. A. BARKSCHAT
PROCESS OF MAKING AND CURING HOLLOW CONCRETE BODIES
Filed March 18, 1922
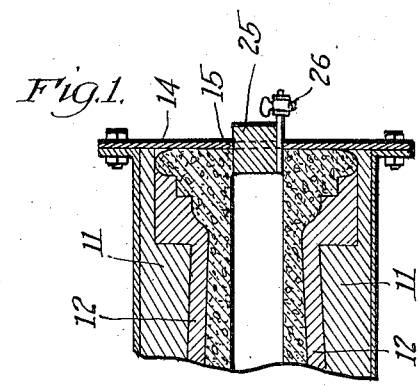
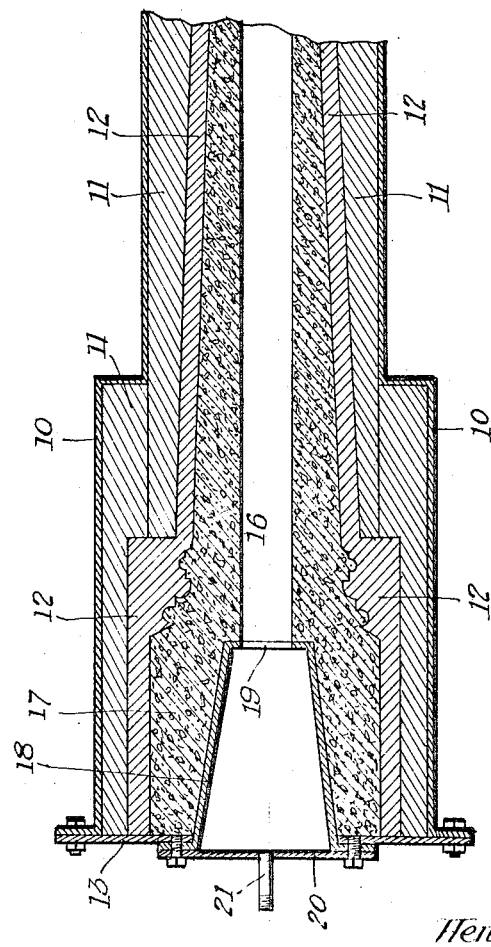
Inventor:
Henry A. Barkschat,
By James T. Barkeley
his Attorneys Patented Jan. 15, 1924.

1,480,740

UNITED STATES PATENT OFFICE.

HENRY A. BARKSCHAT, OF LOS ANGELES, CALIFORNIA.

PROCESS OF MAKING AND CURING HOLLOW CONCRETE BODIES.

Application filed March 18, 1922. Serial No. 544,763.

*To all whom it may concern:*

Be it known that I, HENRY A. BARKSCHAT, a citizen of the United States, residing in Los Angeles, in the county of Los Angeles, State of California, have invented new and useful Improvements in Processes of Making and Curing Hollow Concrete Bodies, of which the following is a detailed specification.

In the casting or molding of hollow concrete bodies, such as lamp posts, telephone and telegraph poles, pipe and other hollow bodies, considerable difficulty has been experienced in quickly setting and curing the concrete after casting, in order that the same molds might be used several times in one day's operations. Ordinarily, in wet casting, molds containing the cast concrete are laid out and left standing for from one to several days' time to allow the concrete to set sufficiently to permit the removal of the cast body from the mold without danger of breaking or cracking. The final set and curing of the concrete takes place and is accomplished after the concrete body has been removed from the mold and is either exposed to the air, or sprayed with water, or totally immersed in water for a certain period of time depending greatly upon the mix and weather conditions as well as upon the size of the body.

It has been my common experience, in setting and curing hollow concrete bodies and the like, made by the centrifugal process, that ordinarily the cast concrete must be allowed to stand in the mold in warm weather for from eight to twelve hours and in cold weather, for from twenty-four hours to several days to gain and acquire sufficient cohesion and strength before such concrete body may be removed from the mold and can be handled without great danger of cracking or breaking.

In the following discussion—in the centrifugal process, after elimination of all surplus moisture and after the concrete has become sufficiently compressed into form to stand up, this action of the concrete mixture will be termed its initial set—and its subsequent action or further setting and hardening will be termed the curing of the concrete. The foregoing explanation is made as the words setting and curing in the hardening action of a concrete mixture are ordinarily used more or less synonymously.

It is well known that the curing of the concrete can be hastened by the application of steam and in the making of brick and blocks and other articles requiring small space and which can readily be removed from the mold without danger of breakage, steam rooms are often being used for their curing.

In the centrifugal process where molds of from five to sixty feet or more in length are being used, and their width measure only from one to three feet, the handling of such posts becomes very delicate and extremely difficult and the use of a steam room impractical—as in order to hasten the curing, the casting would have to be left in the mold and placed in the steam room until it becomes sufficiently cured to allow the removal of the cast from the mold.

In practice of this kind the heat being applied from the outside—the mold must be heated through—the steam and water cannot reach the concrete which tends to often burn the concrete and to deteriorate and warp the molds very rapidly, which makes them unfit for further use. As such molds are very expensive, the ordinary steam room method has proved impractical and too costly to be employed in the curing of hollow concrete articles.

My process of curing the concrete involves the introduction of steam under suitable pressure and at suitable temperature into the interior of a cast hollow concrete body, such as one which has been cast hollow by the centrifugal process.

By thus introducing the steam into the interior of the body, I can cure the concrete and cause it to take a sufficient set for the removal from the mold in about thirty minutes without injury to the concrete body or to the mold. This saving of the mold and the saving of time is a very great advantage over the old method of steam curing and makes commercial production possible. Where formerly the mold could be used only once a day with safety, with my method the mold can be used many times.

In order more fully to demonstrate the operation of my process I shall explain it now as used by me and as applied specifically to a hollow concrete body formed by the centrifugal process; and for that purpose I illustrate in the accompanying drawings a mold with a concrete casting therein, the mold being shown equipped with the appurtenances designed for my present process; the single figure being a longitudinal section.

In the drawings I illustrate a typical form of mold as used by me in the centrifugal process of casting. Such a mold may have partly or entirely an exterior casting 10 of metal; and the mold proper is built up inside this metal casting and usually comprises mold backing members such as shown at 11 and mold face member such as shown at 12. This particular construction is, however, immaterial to the present invention, as some of my molds are lined with metal or constructed entirely of metal. At the ends this mold has cover plates 13 and 14. The cover plate 14 has an aperture 15 about the size of the central opening 16 formed in the concrete casting 17; while cover plate 13 usually carries a core 18 which forms the enlarged hollow in the base of the casting; the end of this core, which itself is hollow, having an opening 19 of suitable size. For the purposes of my present process I make this core 18 hollow; and then I provide a closure plate 20 to close the outer end of the core box 18; and a nipple 21 extends through closure plate 20 for the introduction of steam.

At the other end of the mold a plug 25 or any other suitable closure is provided to be inserted in or over the opening 15 and form a fairly tight closure, and a drain opening or cock is provided at 26 near one edge of this plug, so that when the closure is in position and the drain cock is opened, the cock being arranged at the bottom side of the closure the water of condensation may be drained out of the opening 16 while steam is injected. A slight opening of this drain cock permits steam to circulate through the entire length of the casting—which insures an even distribution of steam and heat—and forces out automatically all water due to condensation.

The mold is set up in the usual manner and is filled with the proper amount of concrete mixture, the core box 18 being in place, but the cover plate 20 and the closure 25 not then being used. The mold is then put into the centrifugal machine where it is rotated about its axis at proper speed, with the result that the concrete is cast into the form shown in the drawings, with the longitudinal central opening 16 therein. After a short time in the centrifugal machine the concrete becomes sufficiently compressed or set to hold its form in the mold, and the mold with the concrete casting is then removed from the machine. Then, in accordance with my process, the cover plate 20 is put in place as illustrated and the closure 25 is also put in place, with the drainage cock 26 closed or partly closed. Steam is then introduced through the nipple 21 at a suitable pressure; anything above atmosphere will do, and in practice I use between 20 and 35 pounds per square inch, and at the corresponding saturated steam temperature. This steam fills the hollow core box 18 and passes through and fills the longitudinal opening 16. A great deal of the steam is condensed, and the hot steam, together with the condensation of the steam, supply the concrete with a large quantity of heat and moisture.

After a short time (I find it averages about ten minutes), the plate 20 and core box 18 are taken off the mold, and then the plate 20 is replaced without the core box 18; so that during the remainder of steam introduction the steam may have direct access to the interior surface of the concrete in its enlarged hollow portion. The core 18 is kept in place during the first few minutes or so in order to obviate any possibility of the concrete breaking or caving in around the enlarged hollow. While the core box is in place the heat of the steam is of course transmitted to the surrounding parts of the concrete, and hastens the setting and curing; but after the core box is taken out then the steam and moisture not only heat the concrete but have direct access to it over its entire inner surface, and impart to it the moisture in combination with the heat—thus protecting the concrete from burning. After about fifteen minutes, or as soon as any quantity of water formed by condensation has collected, the drainage cock 26 is opened so as to release that water, the steam being still fed in at 21.

The steam is then continued to be introduced for a total of about thirty minutes, or until the concrete is found to have sufficient strength that it may be removed from the mold and handled without danger of breakage. I say about thirty minutes, because, with this particular class of concrete casting, I have found that length of time sufficient for the concrete to take on sufficient strength. In practice this point of the process is more or less indicated by the fact that the exterior surface of the mold has become warm. When the exterior surface of the mold becomes warm or hot, depending upon whether the mold is constructed of wood or metal, then the concrete has become uniformly heated and saturated with the steam moisture and is sufficiently set and cured for handling.

Then the end plates 13 and 14 are removed and the concrete casting is ready to be removed from the mold.

My method is particularly effective as applied to hollow concrete bodies, and particularly effective as applied to such hollow concrete bodies as have a longitudinal opening running through them. This applies particularly to hollow posts, poles, pipes, etc. When the steam is fed into the longitudinal opening it of course is in direct contact with the concrete over a large surface area; and the body of steam is then fairly close to all parts of the concrete casting— that is the steam, moisture and heat do not have to travel very far from the interior longitudinal opening to reach all parts of the concrete casting.

It will of course be readily understood that the invention is not necessarily restricted to the particular type or kind of concrete casting here explained, or necessarily restricted to concrete castings that have been formed by centrifugal process although it has certain particular advantages in that connection. Furthermore, it will be understood that various changes and modifications may be made in the procedure without departing from the scope of my invention which I do not intend to be necessarily limited by the specific descriptions here given, but only limited as specifically so stated in the following claims.

Having described a preferred form of my invention, I claim:

1. A process of curing a hollow concrete body that includes introducing steam into the interior of the body under pressure and holding it in the interior under a pressure.

2. A process of curing a hollow concrete body that includes introducing steam into the interior of the body under pressure and holding it in the interior under pressure in direct contact with the concrete, and continuing to introduce the steam until the concrete body is sufficiently set and cured.

3. A process of forming and curing concrete bodies, that includes casting a concrete body by centrifugal process in a mold and forming an axial opening therein, then introducing steam into the opening.

4. A process of forming and curing concrete bodies, that includes casting a concrete body by centrifugal process in a mold and forming an axial opening therein, then introducing steam into the opening, under pressure, and holding it in the opening under pressure until the body is sufficiently set and cured, while the body is still held in the mold.

5. A process of curing a hollow concrete body that includes introducing steam to its interior, allowing the steam to condense in the body, and withdrawing the condensate thereby creating a steam circulation within the body.

In witness that I claim the foregoing, I have hereunto subscribed my name this 9th day of March, 1922.

HENRY A. BARKSCHAT.